(12) United States Patent
Desai et al.

(10) Patent No.: US 11,682,034 B1
(45) Date of Patent: Jun. 20, 2023

(54) REWARDS PROGRAM ACCORDING TO TRANSACTION FREQUENCY

(71) Applicant: American Express Travel Related Services Company, Inc., New York, NY (US)

(72) Inventors: Paayal Desai, New York, NY (US); Katrina Lane, New York, NY (US); Peter Likoudis, Bexley North (AU); Stephanie Rainero, Scoch Plains, NJ (US); Josh Silverman, New York, NY (US); Phyllis Summers, Congress, AZ (US); Peter Tobin, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/186,690

(22) Filed: Feb. 26, 2021

Related U.S. Application Data

(63) Continuation of application No. 16/814,026, filed on Mar. 10, 2020, now abandoned, which is a
(Continued)

(51) Int. Cl.
*G06Q 30/0226* (2023.01)
*G06Q 20/20* (2012.01)
(Continued)

(52) U.S. Cl.
CPC ....... *G06Q 30/0231* (2013.01); *G06Q 20/202* (2013.01); *G06Q 30/0232* (2013.01); *G06Q 30/0235* (2013.01); *G06Q 30/0238* (2013.01)

(58) Field of Classification Search
None
See application file for complete search history.

(56) References Cited

U.S. PATENT DOCUMENTS

| | | |
|---|---|---|
| 5,025,372 A | 6/1991 | Burton et al. |
| 6,018,718 A | 1/2000 | Walker et al. |
| | (Continued) | |

FOREIGN PATENT DOCUMENTS

| | | | | |
|---|---|---|---|---|
| CA | 2792894 A1 | * | 8/2011 | ............. G06Q 20/32 |
| EP | 1136931 A1 | * | 9/2001 | ............. G06Q 20/10 |
| WO | WO 2008/021382 A1 | | 2/2008 | |

OTHER PUBLICATIONS

Brad A. Myers. 1985. The importance of percent-done progress indicators for computer-human interfaces. SIGCHI Bull. 16, 4 (Apr. 1985), 11-17. https://doi.org/10.1145/1165385.317459 (Year: 1985).*
(Continued)

*Primary Examiner* — Meredith A Long
*Assistant Examiner* — Scott Snider
(74) *Attorney, Agent, or Firm* — Sterne, Kessler, Goldstein & Fox P.L.L.C.

(57) ABSTRACT

An electronic record related to a first transaction of a user can be received at a point-of-sale device. A user interface with real-time transaction data can be generated and displayed on the user device. An eligibility of the first transaction for a reward program can be determined. A portion of the reward program based on said determined eligibility can be selected and the electronic record of the first transaction can be updated by modifying the real-time transaction data currently displayed within the UI.

14 Claims, 6 Drawing Sheets

Related U.S. Application Data continuation of application No. 14/254,269, filed on Apr. 16, 2014, now abandoned.

(60) Provisional application No. 61/942,560, filed on Feb. 20, 2014.

(51) Int. Cl.
  *G06Q 30/0235* (2023.01)
  *G06Q 30/0238* (2023.01)

(56) References Cited

U.S. PATENT DOCUMENTS

| | | | |
|---|---|---|---|
| 7,398,225 | B2 | 7/2008 | Voltmer et al. |
| 7,428,498 | B2 | 9/2008 | Voltmer et al. |
| 7,653,571 | B2 | 1/2010 | Jacoves et al. |
| 7,890,367 | B2 | 2/2011 | Senghore et al. |
| 7,899,744 | B2 | 3/2011 | Bishop et al. |
| 8,024,220 | B2 | 9/2011 | Ariff et al. |
| 8,103,585 | B2 | 1/2012 | Bishop et al. |
| 8,140,387 | B2 | 3/2012 | Heywood |
| 8,155,999 | B2 | 4/2012 | de Boer et al. |
| 8,571,919 | B2 | 10/2013 | Rane et al. |
| 8,595,058 | B2 | 11/2013 | Fordyce, III et al. |
| 8,606,630 | B2 | 12/2013 | Fordyce, III et al. |
| 8,660,893 | B2 | 2/2014 | Fordyce, III |
| 8,676,639 | B2 | 3/2014 | Perlman |
| 9,373,120 | B2 | 6/2016 | Nagarajan |
| 9,514,474 | B2 | 12/2016 | Nagarajan |
| 2002/0152179 | A1 | 10/2002 | Racov |
| 2003/0236712 | A1* | 12/2003 | Antonucci ............ G06Q 30/02 705/14.3 |
| 2004/0117249 | A1 | 6/2004 | Wang et al. |
| 2004/0122736 | A1* | 6/2004 | Strock ............... G06Q 30/0207 705/14.31 |
| 2006/0053056 | A1 | 3/2006 | Alspach-Goss et al. |
| 2006/0059040 | A1 | 3/2006 | Eldred et al. |
| 2006/0069619 | A1 | 3/2006 | Walker et al. |
| 2006/0253321 | A1* | 11/2006 | Heywood .......... G06Q 30/0224 705/14.18 |
| 2006/0259364 | A1 | 11/2006 | Strock et al. |
| 2007/0000997 | A1 | 1/2007 | Lambert et al. |
| 2007/0094126 | A1 | 4/2007 | Bufford |
| 2007/0156530 | A1 | 7/2007 | Schmitt et al. |
| 2007/0239521 | A1 | 10/2007 | Khadpe et al. |
| 2008/0082418 | A1 | 4/2008 | Fordyce et al. |
| 2008/0103909 | A1 | 5/2008 | Huang et al. |
| 2009/0063261 | A1 | 3/2009 | Scribner et al. |
| 2010/0114661 | A1 | 5/2010 | Alderfer et al. |
| 2010/0174596 | A1* | 7/2010 | Gilman .............. G06Q 30/0222 705/14.23 |
| 2010/0179888 | A1 | 7/2010 | Warren et al. |
| 2010/0287046 | A1 | 11/2010 | Bennett et al. |
| 2011/0022448 | A1 | 1/2011 | Strock et al. |
| 2011/0040608 | A1 | 2/2011 | Cohen et al. |
| 2011/0078011 | A1 | 3/2011 | Senghore et al. |
| 2011/0106607 | A1 | 5/2011 | Alfonso et al. |
| 2011/0153403 | A1* | 6/2011 | Postrel ................ G06Q 30/02 705/14.29 |
| 2011/0264490 | A1 | 10/2011 | Durvasula et al. |
| 2012/0054000 | A1 | 3/2012 | Boppert et al. |
| 2012/0066045 | A1 | 3/2012 | Schmitt et al. |
| 2012/0066050 | A1 | 3/2012 | Satyavolu et al. |
| 2012/0084164 | A1* | 4/2012 | Hammad ............ G06Q 20/405 705/21 |
| 2012/0101916 | A1 | 4/2012 | Armes et al. |
| 2012/0232971 | A1 | 9/2012 | Pabst et al. |
| 2012/0232982 | A1 | 9/2012 | Durvasula et al. |
| 2012/0259685 | A1 | 10/2012 | Gardner |
| 2012/0259693 | A1 | 10/2012 | Dao |
| 2013/0046621 | A1 | 2/2013 | Asseoff et al. |
| 2013/0144715 | A1 | 6/2013 | Kranzley et al. |
| 2013/0268342 | A1 | 10/2013 | Tune et al. |
| 2013/0275186 | A1 | 10/2013 | Olives et al. |
| 2013/0282437 | A1 | 10/2013 | Cooke et al. |
| 2013/0346174 | A1 | 12/2013 | Mishra et al. |
| 2014/0046748 | A1 | 2/2014 | Nagarajan et al. |
| 2014/0058811 | A1 | 2/2014 | Gorowitz et al. |
| 2014/0149201 | A1 | 5/2014 | Abbott et al. |
| 2015/0006273 | A1 | 1/2015 | Scipioni et al. |

OTHER PUBLICATIONS

Gupt, Mohit, "Android Circular Progress Bar Customization Tutorial", Jun. 23, 2013, https://web.archive.org/web/20130711024705/https://www.truiton.com/2013/06/android-circular-progress-bar-customization-tutorial/ (Year: 2013).*

Sam's Club Discover, https://web.archive.org/web/20131126092038/http://www.samsclub.com/sams/i mag es/Credit_ Cash BackRewards.pdf.

* cited by examiner

FIG. 3B

Extra Reward Benefit

Reward Account Information

| | |
|---|---|
| Rewards Number 1M | Primary Cardmember |
| Rewards Tier MR | Enrollment Date 02/06/2004 |
| Points Available 69 781 | Reward Status ACTIVE |
| Pending Points 4 013 | Total Points Forfeited 0 |

Incremental Spend
Recent Attempts

37xxxxxxxxxxx - C F Frost ▶   Cycle Cut Date: Sep 30, 2012

Select Promo Period [Unbilled ▼]   [Go]

CM needs <u>20</u> eligible charges to earn 20% bonus.

| | |
|---|---|
| # of Charges Remaining to qualify for Bonus | 6 |
| # of Eligible Charges for the Promo Period | 14 |

Charges eligible for Bonus [?]

| Card # ◀▶ | Transaction Date ◀▶ | Posting Date ◀▶ | Merchant Name ◀▶ | Amount ◀▶ | Promo Period ◀▶ |
|---|---|---|---|---|---|
| 11001 | 09/29/2012 | 09/27/2012 | Merchant 1 | $1000.00 | Unbilled |
| 11001 | 09/21/2012 | 09/22/2012 | Merchant 2 | $100.00 | Unbilled |
| 11001 | 09/21/2012 | 09/22/2012 | Merchant 3 | $55.00 | Unbilled |

FIG. 4

REWARDS PROGRAM ACCORDING TO TRANSACTION FREQUENCY

CLAIM OF PRIORITY

This application is a continuation of, and claims priority from co-pending U.S. patent application Ser. No. 16/814,026, filed Mar. 10, 2020, entitled "SYSTEM AND METHOD FOR FREQUENCY BASED REWARDS," which is a continuation of and claims priority to U.S. patent application Ser. No. 14/254,269, filed Apr. 16, 2014, entitled "SYSTEM AND METHOD FOR FREQUENCY BASED REWARDS," which claims priority to and the benefit from U.S. Provisional Patent Application Ser. No. 61/942,560, filed Feb. 20, 2014, entitled "SYSTEM AND METHOD FOR FREQUENCY BASED REWARDS," all of which are hereby incorporated by reference for all purposes.

FIELD

The present disclosure relates to systems and methods for awarding a reward, and more specifically, awarding of a loyalty reward based on a spending frequency.

BACKGROUND

Typical reward systems may provide reward for purchase frequency. These programs typically require a first number of purchases (e.g., buy 3) to earn a second reward (e.g., get 1 free). However, these reward programs typically require that a customer return to a particular merchant to make purchases. These programs also typically require that the customer carry a reward tracker (e.g., a punch card).

SUMMARY

A system, method, and computer readable medium (collectively, the "System") for administering a reward program may comprise operations and/or steps, including: determining, by the computer based system, that a first transaction is eligible for a first portion of a reward program and a second portion of the reward program, wherein the first transaction is from a plurality of transactions; determining, by the computer based system, a first reward associated with an amount of the first transaction, in response to the first transaction being eligible for the first portion of the reward program; associating, by the computer based system, the first transaction with a transaction account, in response to the first transaction being eligible for the second portion of the reward program; monitoring, by the computer based system, a number of transactions associated with the transaction account over a first period of time; determining, by the computer based system, a second reward of in response to the number of transactions associated with the transaction account over the first period of time exceeding a threshold, wherein the second reward is determined as a function of a total reward earned based on the amount of the transactions associated with the transaction account over the first period of time, and wherein the total reward includes the first reward. In various embodiments, the computer based system may be operated by a network connecting a point of sale to a payment processor.

In various embodiments, the first period of time may be a billing period. The number of transactions associated with the transaction account over the first period of time may include a set of transactions that were initiated during the billing period.

In various embodiments, at least one of the first reward and the second reward are provided in reward currency. The first reward and the second reward may be of the same reward type.

In various embodiments, the second portion of the reward program is associated with the threshold. The threshold is a number of transactions and a total transaction amount for the number of transactions.

In various embodiments, a number of transactions eligible for the second portion of the reward program is displayed via a micro-application in real-time.

In various embodiments, the System may further comprise analyzing, by the computer based system, the first transaction to determine that the first transaction is associated with the first period of time. The associating with a transaction account associated with the first transaction in response to the first transaction being eligible for the second portion of the reward program may be in response to the first transaction being associated with the first period of time. The first transaction may be received during a second period of time. The first transaction may also be received during the first period of time. In various embodiments, the System may further comprise determining, by the computer based system, the time when the transaction was initiated.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 3B illustrates a web-based spending frequency tracking interface, in accordance with various embodiments; and FIG. 4 illustrates a web-based spending frequency reward program user interface, in accordance with various embodiments.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
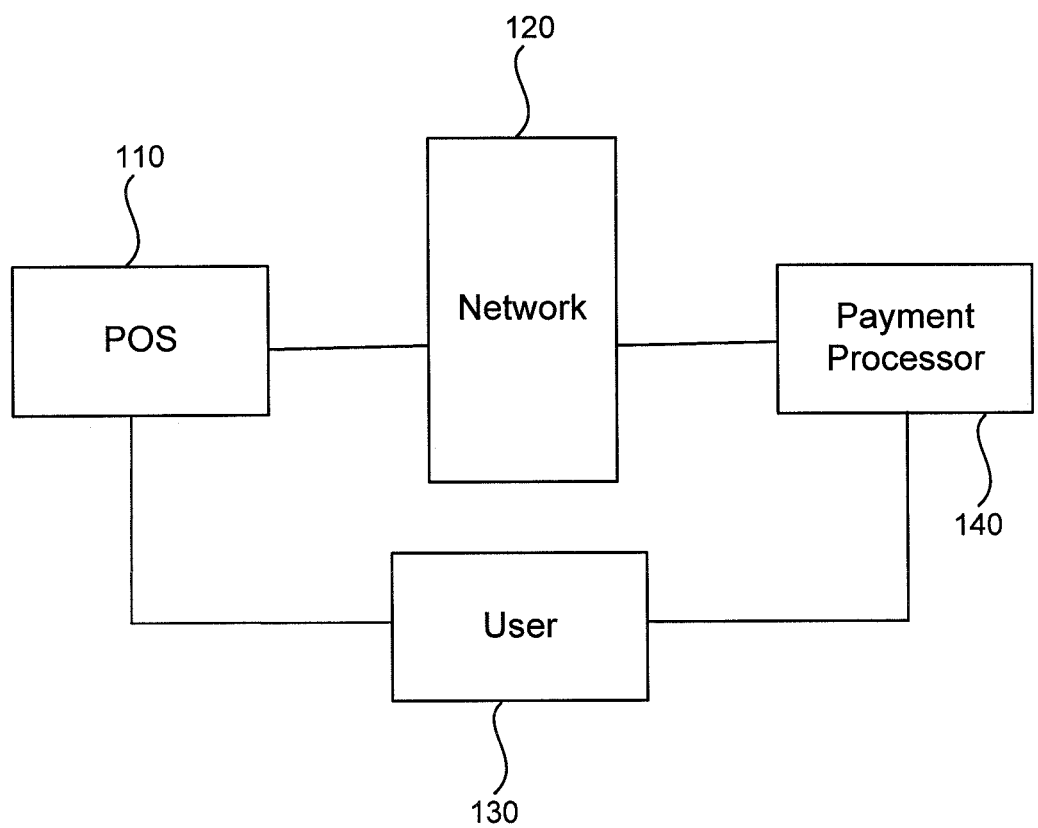
FIG. 1A is a block diagram illustrating various system components of a payment system, in accordance with various embodiments.

In various embodiments, and with reference to FIG. 1A, a payment system 100 may comprise a POS 110, a network 120 and a payment processor 140. POS 110 may be in electronic communication with and/or operatively coupled to payment processor 140 via network 120. Network 120 may be any suitable payment network including, for example, the American Express® Network, the Visa® network, the MasterCard® network, the Discover® card network, and/or the like. In this regard, network 120 may be configured to receive transaction information from POS 110 and/or an entity capable of gathering transaction information from POS 110. Moreover, network 120 may be configured to facilitate the communications of the transaction information from POS 110 to the payment processor 140 in substantially real time. In this regard, network 120 may be capable of and/or configured to facilitate an authorization of a transaction initiated at POS 110. In various embodiments, network 120 may include at least a portion of POS 110 and/or payment processor 140, or at least a portion of the functions of POS 110 and/or payment processor 140.

Phrases similar to a "payment processor" (e.g., payment processor 140) may include a company (e.g., a third party) appointed (e.g., by a merchant) to handle transactions. A payment processor may include an issuer, acquirer, authorizer, network 120 and/or any other system or entity involved in the transaction process, and/or at least a portion of the functions of such entities. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

In various embodiments, a user 130 may be capable of interacting with POS 110, network 120, and/or payment processor 140. For example, user 130 may interact with POS 110 (e.g., a merchant, a website, an app, a virtual point of sale, a physical point of sale, and/or the like) to initiate a transaction. Moreover, user 130 may interact with a payment processor to settle a transaction, fund a transaction, and/or the like.

In various embodiments, user 130 may interact with a payment processor or network 120 by registering with the payment processor or network 120. In operation, payment processor or network 120 may be capable and/or configured to facilitate authorization and/or settlement of transactions by analyzing information from POS 110 and a payment processor 140. However, networks may not be capable of and/or configured to monitor, track, and/or record, and/or count the number of transactions associated with a particular user. Moreover, the transaction information communicated between a point of sale and payment processor may not be sufficient to particularly identify user by a network.

In various embodiments, payment processor 140 and/or network 120 may be capable of providing a reward program and/or operating a reward system (e.g., reward system 150). For simplicity, the disclosure will discuss operations by network 120, but one skilled in the art will appreciate that payment processor 140 may perform one or more of the functions.

In order for network 120 to provide a reward program to user 130, network 120 may provide and/or allow user 130 to register with network 120. Network 120 may request information from user 130, including, for example, a transaction account number, a transaction account identifier, and/or the like. This information provided by user 130 may allow and/or enable network 120 to identify, track, count, and/or otherwise monitor transaction information and/or information indicative of a transaction that is passed between POS 110 and/or payment processor 140 by network 120.

In various embodiments, network 120 may be able to particularly identify and/or associate one or more transactions with a particular user 130. Such identification may occur if user 130 registers with and/or opts-in to a reward program provided by network 120. Moreover, information provided by user 130 may be used by network 120 to particularly identify transactions routed between POS 110 and payment processor 140 by network 120.

Figure 1B:
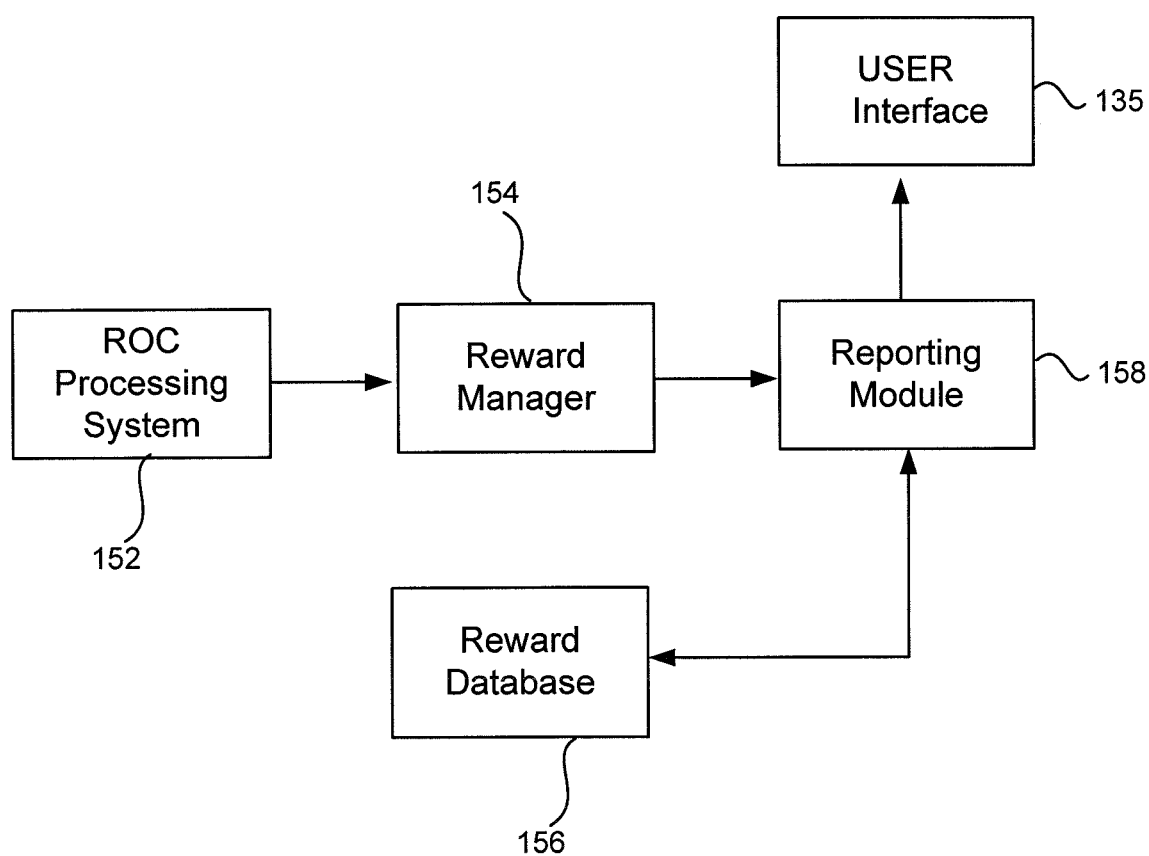
FIG. 1B is a block diagram illustrating various system components of a rewards system, in accordance with various embodiments.

In various embodiments, and with reference to FIGS. 1A and 1B, reward system 150 may comprise a transaction processing system 152, a reward manager 154, a reporting module 158, and a user interface 135. Reward manager 154 may further comprise a reward database 156. Reward system 150 may be any suitable software, hardware and/or hardware-software system configured to provide a reward based on a purchase and a supplemental reward based on a number of purchases during a pre-determined period (e.g., a purchase frequency).

In various embodiments, reward system 150 may be operated by network 120 and/or payment processor 140. Moreover, reward system 150 may be in electronic communication with POS 110. In this regard, reward system 150 may be capable of communicating with user 130 via POS 110 and/or any other suitable communication medium, including, for example, e-mail, a mobile device via a micro-application, an SMS message, and/or any device or process discussed herein or otherwise known.

In various embodiments, transaction processing system 152 may be any suitable software, hardware and/or hardware-software system configured to process merchant submissions. In this regard, transaction processing system 152 may receive submission files containing transactions from a merchant. Transaction processing system 152 may process the transaction (Step 210). Typically, the transactions are associated with transactions that occurred within days of the submission file being submitted to the transaction processing system 152.

In various embodiments, reward manager 154 may be any suitable software, hardware and/or hardware-software system configured to manage a reward program, analyze a transaction, create reward credits and debits, create reward instructions, create reward notification instructions, track the progress of rewards, analyze reward criteria, and/or provide rewards to users. Reward manager 154 may be operatively coupled to and/or in communication with reward database 156. Reward database 156 may be configured to store reward information and/or transaction information and track the frequency of transactions associated with a particular transaction account.

In various embodiments, reward manager 154 may administer a rewards program capable of providing frequency based rewards. The rewards program may comprise a first portion and a second portion. One skilled in the art will appreciate that the first portion and the second portion may include certain overlapping functionality and features, and certain separate functionality and features.

The first portion may be configured to provide a first reward (e.g., an award of loyalty points, a rebate amount, a reward currency, a loyalty currency, and/or the like) for each transaction (e.g., purchase made) using a transaction account based on an amount of the transaction. For example, the first portion may be a program similar to the American Express Membership Rewards® program. The reward program may also comprise a second portion. The second portion may be configured to prove a second reward, a supplemental reward, a compound reward, an ancillary reward, a substitute reward, a change of a reward, and/or the like (e.g., an award of loyalty points, a rebate amount, a reward currency, a loyalty currency, and/or the like). In this regard, the second portion may provide an additional benefit or reward beyond the reward provided in the first program.

In various embodiments, the first portion may provide a reward in a first reward currency. The second portion may provide a reward in a second reward currency. The first reward currency and the second reward currency may be the same reward currency. The first reward currency and the second reward currency may be different reward currencies. For example, in a first reward program, the first portion and the second portion may be configured to provide rewards based on the rules governing the first portion and the second portion. In a second reward program, the first portion may be configured to provide a first reward (e.g., a loyalty currency, points, a discount, a rebate, an item, access, an experience, a status level, monetary value, non-monetary value, and/or the like) and the second portion may be configured to provide a second reward (e.g., a loyalty currency, points, a discount, a rebate, an item, access, an experience, a status level, monetary value, non-monetary value, and/or the like) that is different than the first reward.

In various embodiments, reward manager 154 and/or reward database 156 may be configured to determine transaction eligibility (step 220). Reward manager 154 and/or reward database 156 may also provide a first reward for eligible purchases (step 225). In this regard, reward manager 154 and/or reward database 156 may be configured to provide a reward (e.g., points, a credit, and/or any other suitable reward) based on the amount of a purchase as would be typically provided in a reward program such as, for example, the American Express Membership Reward Program®. Moreover, reward manager 154 and/or reward database 156 may be capable of associating qualifying transaction with a transaction account (step 230).

In various embodiments, reward manager 154 and/or reward database 156 may be configured to monitor the number of eligible transactions associated with a transaction account over a pre-determined period of time (step 240). In this regard, reward manager 154 and/or reward database 156 may be configured to count, store, track and/or otherwise monitor the number of qualifying purchases associated with the transaction account over a pre-determined period of time (e.g., a billing period). In this regard, reward manager 154 and/or reward database 156 may count the number of transactions completed with a transaction account based on the number of transactions received by transaction processing system 152. Reward manager 154 and/or reward database 156 may not consider authorizations in the number of eligible transactions and/or transactions received over the pre-determined period of time.

In various embodiments, as part of the eligibility determination and/or monitoring reward manager 154 may determine whether the transaction is associated with a particular period of time (e.g., billing period). This determination may be based on when the transaction was initiated (e.g., when the authorization request occurred) and/or when the transaction was received by the transaction account issuer (e.g., the time the transaction was posted). In this regard, a number of transactions may be correlated to a number of authorization requests received during a particular period of time. A number of transactions may also be determined in real-time as the transactions are received by transaction processing system 152, reward manager 154 and/or a transaction account issuer. In this regard, the transaction may be associated with the date that the transaction was initiated regardless of when the transaction was received by transaction processing system 152, reward manager 154 and/or a transaction account issuer. In this regard, transaction processing system 152, reward manager 154 and/or a transaction account issuer may be capable of associating a period of time that has already past (e.g., a prior billing period).

In various embodiments, reward manager 154 and/or reward database 156 may be configured to communicate the number of eligible transactions received via transaction processing system 152 to reporting module 158. Reporting module 158 may be configured to report the number of eligible transactions associated with the transaction account through user interface 135. User interface 135 may be any suitable user interface, including for example a mobile channel, a web channel, an email and/or the like. For example, reward manager 154 and/or reward database 156 may communicate a number of purchases to reporting module 158. Reporting module 158 may communicate and/or display the number of purchases on user interface 135. In operation in a mobile channel, and with momentary reference to FIG. 3A, reporting module 158 and/or user interface 135 may be configured to display progress toward a pre-determined number of transactions. For example, and as shown in mobile channel 310, user interface 135 may display a progress tracker. The progress tracker may change as shown in mobile channel 320 in response to purchases that are received through transaction processing system 152 and processed and/or analyzed by reward manager 154 and reward database 156. Moreover, reward manager 154, reward database 156, and/or reporting module 158 may communicate the progress of accumulated transactions (e.g., the number of transaction and/or a list of transaction details) for a particular transaction account through user interface 135, as shown in mobile channel 320 (e.g., 18 qualifying purchases within the billing period). Moreover, reporting module 158 may be configured to display a success message and/or indication when a sufficient number of transactions are received via transaction processing system 152 and analyzed as eligible transactions by reward manager 154 and/or reward database 156 as shown in mobile channel 330.

Figure 3A:
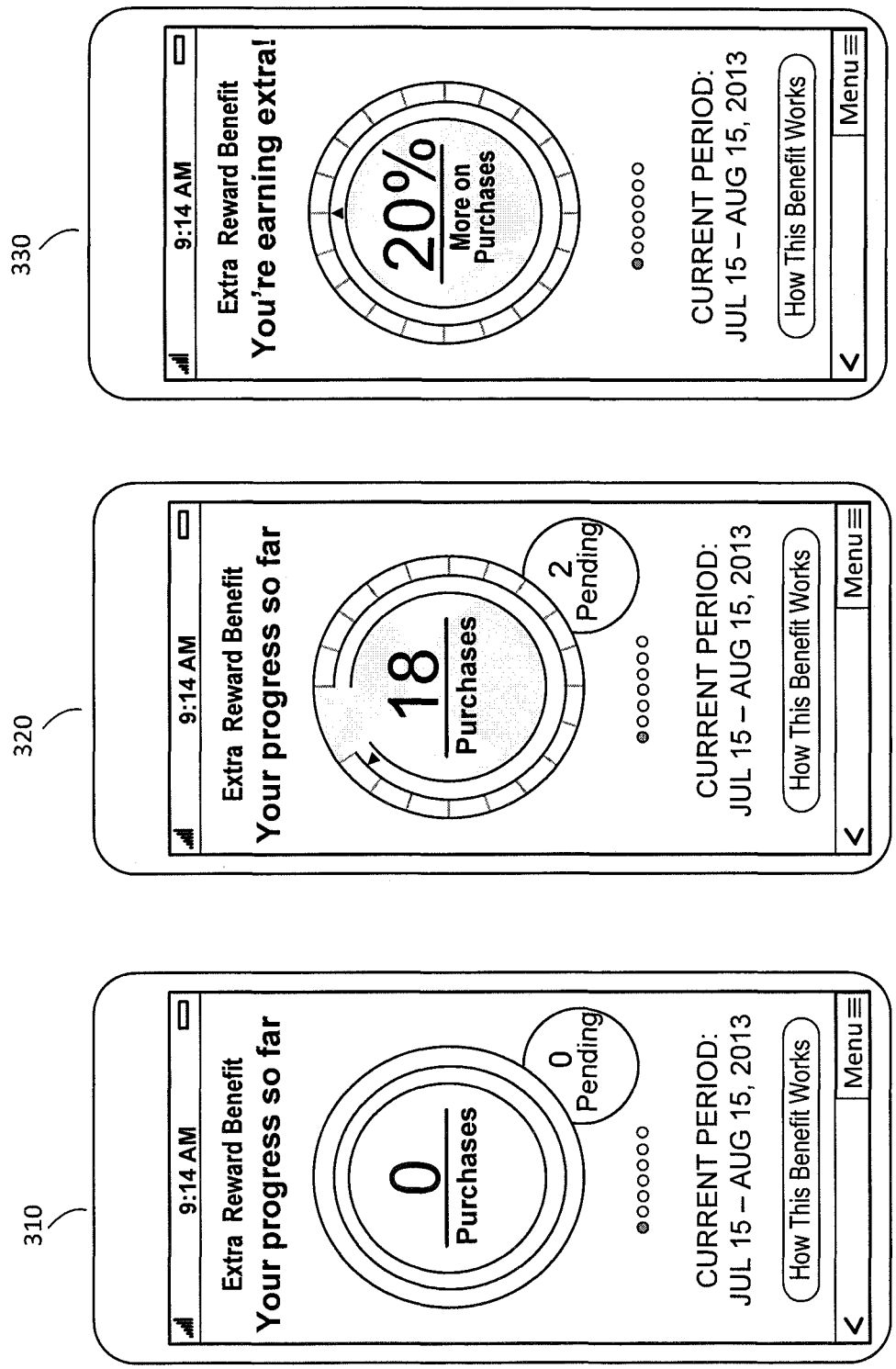
FIG. 3A illustrates a mobile device based spending frequency tracking interface, in accordance with various embodiments.
Figure 3B:
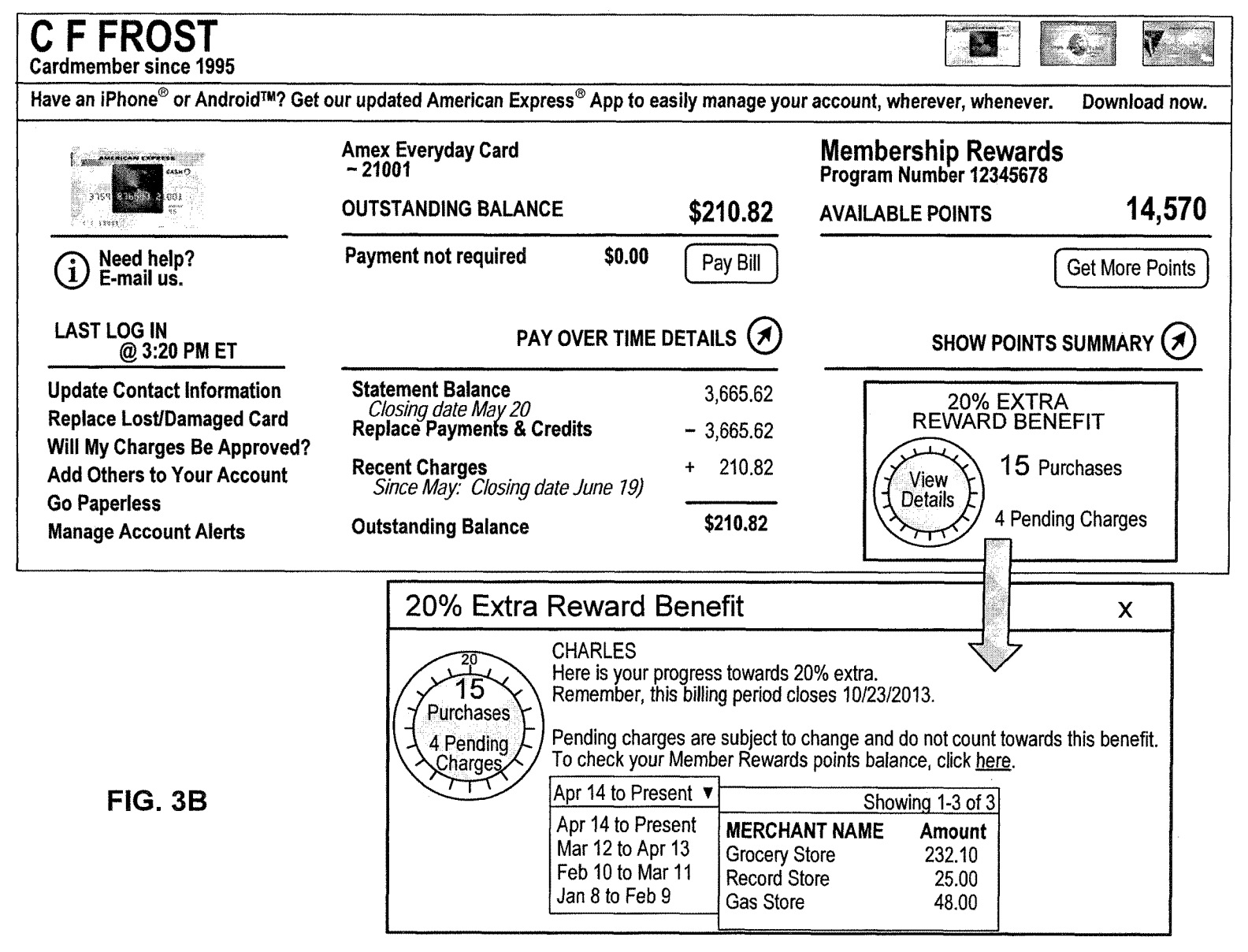

In various embodiments, reporting module 158 and/or user interface 135 may be embodied in an on-line environment, as shown in FIG. 3B, similar to the mobile environment shown in FIG. 3A. User interface 135 in a web environment may be configured to track transactions received by transaction processing system 152 and determined to be eligible by reward manager 154 and/or reward database 156. Moreover, the web interface of user interface 135 may be configured to track the progress and/or number of purchases completed during the pre-determined period (e.g., a billing period). In a web environment, user interface 135 may be interactive and/or selectable. User interface 135 and/or the tracker of qualifying transactions may be selectable. In this regard, the tracker may include a summary (e.g., the number of qualifying purchases) and a list of the qualifying purchases in the pre-determined time period. Moreover, and with reference to FIG. 4, user interface 135 may be capable of listing qualifying purchases that are eligible for a supplemental reward, and summarizing the number of eligible purchases during the pre-determined period and the number of purchases required to reach the supplemental reward.

Figure 2:
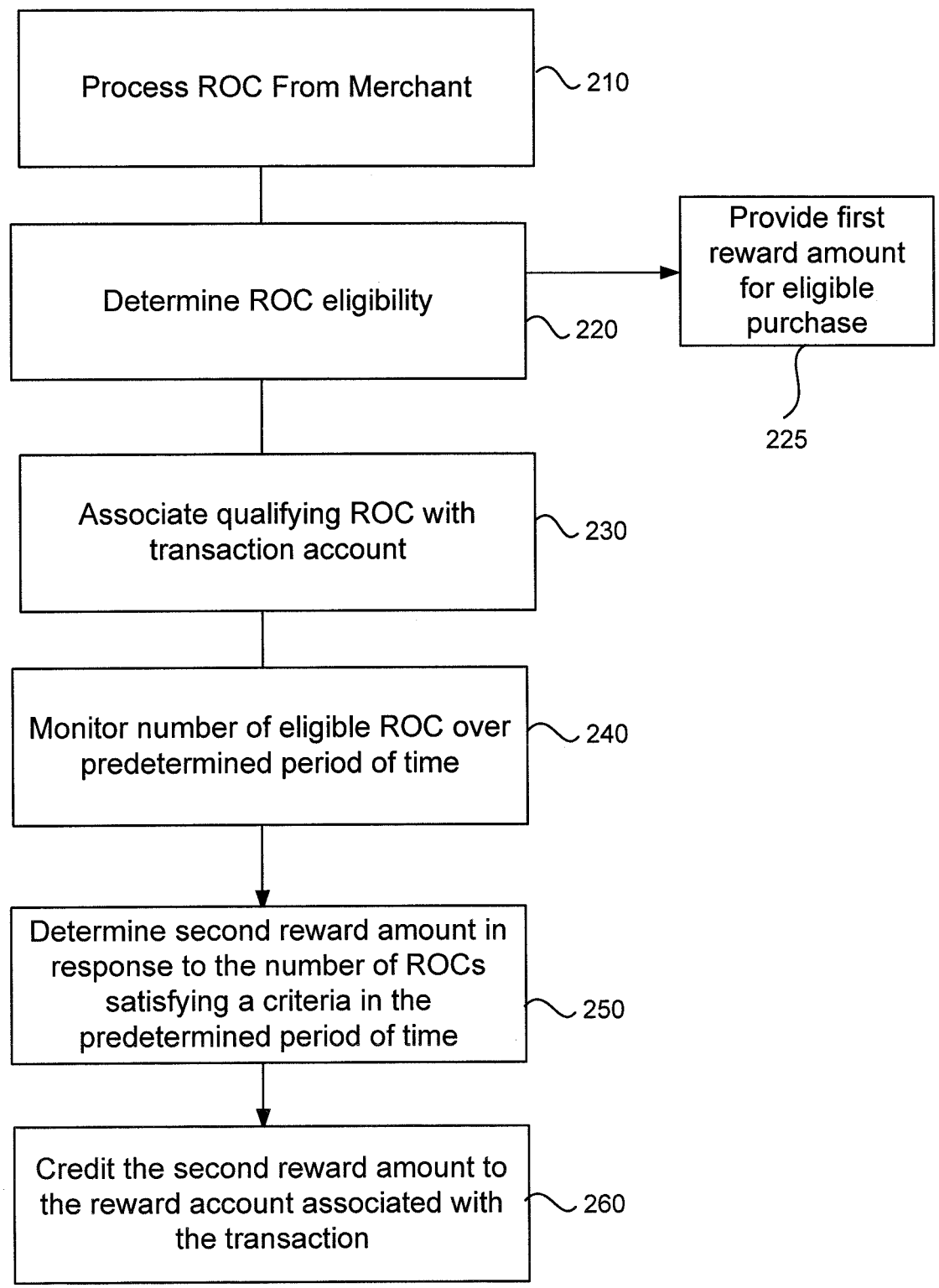
FIG. 2 illustrates a process flow for a spending frequency based reward, in accordance with various embodiments.

In various embodiments, and with reference to FIG. 2, reward manager 154 and/or reward database 156 may be configured to determine second reward, in response to the number of qualifying transactions satisfying criteria in the pre-determined period of time (Step 250). In this regard, a reward program being administered by reward manager 154 and/or reward database 156 may be configured with reward criteria for providing the second reward. The criteria may include a number of purchases and/or purchasing frequency. A purchasing frequency may include a number of purchases over a pre-determined period of time. For example, a reward program may provide a second award of a percentage of the total reward earned from qualifying purchases during a period, if the transaction account associated with the reward program makes a pre-determined number of purchases (e.g., 20) over a pre-determined period of time (e.g., a billing period). In this regard, the second award of points may be a function of the number of transactions initiated in a period of time and the total amount of those transactions. For example, if a user earns 1,000 points from 20 purchases in a billing period and is entitled to second award of points of 20 percent of the total number of points earned from the 20 purchases, then the second award of points would be 200 points and, for example, less returns and credits within the time period. While the returns and credits may not affect the numbers of transactions received during it period of time, the returns and credits may affect the number of points used to determine the second award. Moreover, the criteria of the reward program may provide that the number of purchases required is a minimum number, and that all transaction and all points earned during the billing period with be part of the second award of points. The criteria may also specify that the second award of points is limited to the first 20 purchases during a billing period. In this case, only the first 20 purchases and the total number of points associated with those purchases will be used to determine the second award of points.

In various embodiments, purchasing frequency may be defined in any suitable manner. For example, purchasing frequency may be defined as a number of purchases at a particular retailer over a particular time, a number of purchases for an item (e.g., a particular type or class of item, a number of items from a manufacturer or group of manufactures and/or the like) over a particular period of time. Moreover, purchasing frequency may include a number of purchases and an amount for each purchase (e.g., X number of purchases, where the transaction amount for the purchases is equal to or greater than a threshold Y) over a particular period of time.

In various embodiments, the second number of points may be determined based on a trigger. This trigger may include receiving the number of authorizations associated with the number of purchases required for a reward. This trigger may include receiving the number of transactions associated with the number of purchases required for a reward. In the case of transactions, reward manager 154 and/or transaction processing system 152 may be configured to analyze transactions and retroactively apply them to a period of time to meet a transaction frequency (e.g., a number of transactions initiated in a period of time), even though the transaction may be received after the period of time has passed (e.g. after the billing cycle is over). This trigger may include receiving payment of an outstanding bill for the transaction account and/or any other suitable trigger.

Reward manager 154 and/or reward database 156 may also be configured to credit the second award to the reward account associated with the transaction account (step 260). In response to the crediting, reporting module 158 and/or user interface 135 may display an indication that the second reward was credited via a user interface including, for example, a mobile user interface, e-mail, and/or web user interface.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may be may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a radio frequency identifier ("RFID"), a biometric, and the like.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer®, Mozilla Firefox®, Google® Chrome, Apple® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like.

The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (IW) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases and terms similar to "transaction" may include any purchase, authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by a one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, POP, PKI, GPO (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of

The invention claimed is:

1. A method comprising:
receiving, at a computing device of a reward system over a payment network from a point-of-sale (POS) device, an electronic record related to a first transaction of a user, the electronic record comprising information indicating a time an authorization request for the first transaction was initiated and a time the first transaction was authorized, the electronic record further comprising an amount and information associated with the POS device on the network;
generating, via the computing device of the reward system, a user interface (UI) for the user, the UI comprising a display of real-time transaction data associated with the user, the UI currently displaying at least the amount and POS information of the first transaction;
communicating, via the computing device of the reward system, the UI to a device of the user, said communication causing the UI to be displayed on a display of the user device;
determining, via the computing device of the reward system, eligibility of the first transaction for a reward program, the determination comprising analyzing the authorization request time and the time the first transaction was authorized, and determining that the times of the first transaction correspond to a specific period of time within the reward program;
selecting, via the computing device of the reward system, a portion of the reward program based on said determined eligibility, the reward program comprising a first portion and a second portion, the first portion comprising functionality for modifying a value of the amount of the electronic record based on a current reward value of the user within the reward program, the second portion comprising functionality for adding reward values to the current reward value based on a number of transactions associated with the reward program over the specific period of time exceeding a threshold number;
monitoring, via the computing device of the reward system, a number of eligible transactions of the second portion over the specific period of time;
determining a number of pending transactions over the specific period of time that are not yet eligible;
wherein the display of real-time transaction data associated with the user further comprises a display of a progress tracker communicating a status of a current number of the eligible transactions for the second portion, wherein the progress tracker comprises at least a first segmented graphic, wherein each segment of the first segmented graphic comprises one of the number of eligible transactions of the second portion over the specific period of time and a number of the segments comprises the threshold number, wherein the progress tracker comprises a second graphic illustrating the number of pending transactions;
modifying, via the computing device of the reward system, the UI based on selection of the second portion, the modification comprising changing a display of the electronic record in accordance with functionality of the second portion, wherein the changed display indicates an additional reward value being added to the electronic record of the first transaction;
updating, via the computing device of the reward system, based on the selected portion, the electronic record of the first transaction by modifying the real-time transaction data currently displayed with the UI; and
communicating, via the computing device of the reward system, an update instruction to the user device causing the UI to be dynamically modified to display current real-time transaction data of the electronic record based on the functionality of the selected portion of the reward program.

2. The method of claim 1, further comprising:
selecting the first portion based on the eligibility determination.

3. The method of claim 1, wherein said UI is associated with a web page, wherein said webpage is updated without reloading the web page, and is updated based on updated instructions for each electronic record from the computing device.

4. The method of claim 1, wherein the progress tracker is updated based on the communicated update instruction, the updating of the progress tracker comprising modifying how progress to a goal within the progress tracker is changed based on an update of the electronic record in accordance with the selected portion.

5. The method of claim 1, wherein the eligibility is based on the time of the authorization request, wherein the authorization request time being initiated during the specific period of time is a basis for the eligibility determination.

6. The method of claim 1, wherein the eligibility is based on the time the first transaction was authorized, the time corresponding to a time the first transaction was posted by the computing device, wherein the posting time is a basis for the eligibility determination.

7. A non-transitory computer-readable storage medium tangibly encoded with computer executable instructions, that when executed by a computing device, perform a method comprising:
receiving, at the computing device of a reward system over a payment network from a point-of-sale (POS) device, an electronic record related to a first transaction of a user, the electronic record comprising information indicating a time an authorization request for the first transaction was initiated and a time the first transaction was authorized, the electronic record further comprising an amount and information associated with the POS device on the network;
generating, via the computing device of the reward system, a user interface (UI) for the user, the UI comprising a display of real-time transaction data associated with the user, the UI currently displaying at least the amount and POS information of the first transaction;
communicating, via the computing device of the reward system, the UI to a device of the user, said communication causing the UI to be displayed on a display of the user device;
determining, via the computing device, eligibility of the first transaction for a reward program, the determination comprising analyzing the authorization request time and the time the first transaction was authorized, and determining that the times of the first transaction correspond to a specific period of time within the reward program;
selecting, via the computing device of the reward system, a portion of the reward program based on said determined eligibility, the reward program comprising a first portion and a second portion, the first portion comprising functionality for modifying a value of the amount of the electronic record based on a current reward value of the user within the reward program, the second portion comprising functionality for adding reward values to the current reward value based on a count of transactions, associated with the reward program over the specific period of time, exceeding a threshold number;

monitoring, via the computing device of the reward system, a number of eligible transactions of the second portion over the specific period of time;

determining a number of pending transactions over the specific period of time that are not yet eligible;

wherein the display of real-time transaction data associated with the user further comprises a display of a progress tracker communicating a status of a current number of the eligible transactions for the second portion, wherein the progress tracker comprises at least a first segmented graphic, wherein each segment of the first segmented graphic comprises one of the number of eligible transactions of the second portion over the specific period of time and a number of the segments comprises the threshold number, wherein the progress tracker comprises a second graphic illustrating the number of pending transactions;

modifying, via the computing device of the reward system, the UI based on selection of the second portion, the modification comprising changing a display of the electronic record in accordance with functionality of the second portion, wherein the changed display indicates an additional reward value being added to the electronic record of the first transaction;

updating, via the computing device of the reward system, based on the selected portion, the electronic record of the first transaction by modifying the real-time transaction data currently displayed within the UI; and communicating, via the computing device of the reward system, an update instruction to the user device causing the UI to be dynamically modified to display current real-time transaction data of the electronic record based on the functionality of the selected portion of the reward program.

8. The non-transitory computer-readable storage medium of claim 7, further comprising:

selecting the first portion based on the eligibility determination.

9. The non-transitory computer-readable storage medium of claim 7, wherein said UI is associated with a web page, wherein said webpage is updated without reloading the web page, and is updated based on updated instructions for each electronic record from the computing device.

10. The non-transitory computer-readable storage medium of claim 7, wherein the progress tracker is updated based on the communicated update instruction, the updating of the progress tracker comprising modifying how progress to a goal within the progress tracker is changed based on an update of the electronic record in accordance with the selected portion.

11. The non-transitory computer-readable storage medium of claim 7, wherein the eligibility is based on the time of the authorization request, wherein the authorization request time being initiated during the specific period of time is a basis for the eligibility determination.

12. The non-transitory computer-readable storage medium of claim 7, wherein the eligibility is based on the time the first transaction was authorized, the time corresponding to a time the first transaction was posted by the computing device, wherein the posting time is a basis for the eligibility determination.

13. A computer system comprising:

a processor; and a non-transitory memory configured to communicate with the processor, the non-transitory memory having instructions stored thereon that when executed by the processor cause the processor to perform operations comprising:

receiving, over a payment network from a point-of-sale (POS) device, an electronic record related to a first transaction of a user, the electronic record comprising information indicating a time an authorization request for the first transaction was indicated and a time the first transaction was authorized, the electronic record further comprising an amount and information associated with the POS device on the network;

generating a user interface (UI) for the user, the UI comprising a display of real-time transaction data associated with the user, the UI currently displaying at least the amount and POS information of the first transaction;

communicating the UI to a device of the user, said communication causing the UI to be displayed on a display of the user device;

determining eligibility of the first transaction for a reward program, the determination comprising analyzing the authorization request time and the time the first transaction was authorized, and determining that the times of the first transaction correspond to a specific period of time within the reward program;

selecting a portion of the reward program based on said determined eligibility, the reward program comprising a first portion and a second portion, the first portion comprising functionality for modifying a value of the amount of the electronic record based on a current reward value of the user within the reward program, the second portion comprising functionality for adding reward values to the current reward value based on a count of transactions, associated with the reward program over the specific period of time, exceeding a threshold number;

monitoring a number of eligible transactions of the second portion over the specific period of time;

determining a number of pending transactions over the specific period of time that are not yet eligible;

wherein the display of real-time transaction data associated with the user further comprises a display of a progress tracker communicating a status of a current number of the eligible transactions for the second portion, wherein the progress tracker comprises at least a first segmented graphic, wherein each segment of the first segmented graphic comprises one of the number of eligible transactions of the second portion over the specific period of time and a number of the segments comprises the threshold number, wherein the progress tracker comprises a second graphic illustrating the number of pending transactions;

modifying the UI based on selection of the second portion, the modification comprising changing a display of the electronic record in accordance with functionality of the second portion, wherein the changed display indicates an additional reward value being added to the electronic record of the first transaction;

updating, based on the selected portion, the electronic record of the first transaction by modifying the real-time transaction data currently displayed within the UI; and communicating an update instruction to the user device causing the UI to be dynamically modified to display current real-time transaction data of the electronic record based on the functionality of the selected portion of the reward program.

14. The computer system of claim 13, wherein said progress tracker is updated based on the communicated update instruction, said updating of the progress tracker comprising modifying how progress to a goal within the progress tracker is changed based on an update of the electronic record in accordance with the selected portion.

\* \* \* \* \*